(12) United States Patent
Musy et al.

(10) Patent No.: US 12,472,867 B2
(45) Date of Patent: Nov. 18, 2025

(54) VEHICLE TRIM PART WITH LIGHTING FUNCTION

(71) Applicants: Faurecia Innenraum Systeme GmbH, Hagenbach (DE); HELLA GmbH & Co. KGaA, Lippstadt (DE)

(72) Inventors: Maxime Musy, Karlsruhe (DE); Heiko Schöne, Zell im Wiesental (DE)

(73) Assignees: HELLA GmbH & Co. KGaA, Lippstadt (DE); Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 18/750,085

(22) Filed: Jun. 21, 2024

(65) Prior Publication Data
US 2025/0028111 A1   Jan. 23, 2025

(30) Foreign Application Priority Data

Jul. 21, 2023   (DE) ...................... 10 2023 206 982.2

(51) Int. Cl.
*B60Q 3/62* (2017.01)
*B60Q 3/54* (2017.01)
*F21V 8/00* (2006.01)

(52) U.S. Cl.
CPC .................. *B60Q 3/62* (2017.02); *B60Q 3/54* (2017.02); *G02B 6/0088* (2013.01)

(58) Field of Classification Search
CPC ..................... B60Q 3/54; B60Q 3/62
See application file for complete search history.

(56) References Cited

U.S. PATENT DOCUMENTS

| 11,872,933 | B1 * | 1/2024 | Kim | F21V 3/049 |
|---|---|---|---|---|
| 2022/0097628 | A1 * | 3/2022 | Yu | B60Q 3/54 |
| 2022/0365386 | A1 * | 11/2022 | Cuvillier | G02B 6/0055 |
| 2023/0098251 | A1 * | 3/2023 | Brohm | G02B 6/0088 |
| 2023/0158950 | A1 * | 5/2023 | Cuvillier | B60K 35/28 |
| | | | | 315/77 |
| 2023/0264638 | A1 * | 8/2023 | Aumann | B32B 5/026 |
| | | | | 362/459 |
| 2024/0168213 | A1 * | 5/2024 | Zhang | F21S 43/145 |

FOREIGN PATENT DOCUMENTS

| CN | 109398258 A | * | 3/2019 | ............. B60K 35/00 |
|---|---|---|---|---|
| EP | 3573043 A2 | | 11/2019 | |
| JP | 2009073442 A | | 4/2009 | |

OTHER PUBLICATIONS

"German Application No. 10 2023 206 982.2, Search Report dated Apr. 15, 2024", w English Translation, (Apr. 15, 2024), 11 pgs.

* cited by examiner

*Primary Examiner* — Keith G. Delahoussaye
(74) *Attorney, Agent, or Firm* — Schwegman Lundberg & Woessner, P.A.

(57) ABSTRACT

A vehicle trim part with a lighting function can comprise an at least partially light transmitting cover layer and a light emitting light system for at least partially emitting light towards the cover layer. A carrier can be arranged between the light emitting light system and the cover layer. The carrier can comprise a plurality of recesses and a plurality of through holes, each being arranged on a surface of the carrier facing the cover layer and open towards the cover layer, and wherein the plurality of recesses are closed towards the light emitting light system and the plurality of through holes being open towards the light emitting light system.

17 Claims, 1 Drawing Sheet

VEHICLE TRIM PART WITH LIGHTING FUNCTION

CLAIM FOR PRIORITY

This application claims the benefit of priority of German Application No. 10 2023 206 982.2, filed Jul. 21, 2023, which is hereby incorporated by reference in its entirety.

TECHNICAL FIELD

The present property right relates to a vehicle trim part with lighting function, in particular a vehicle interior trim part with lighting function.

BACKGROUND

Vehicle trim parts with lighting function can be used to improve the overall aesthetic impression and the visibility of a vehicle's operating and display elements. Typical vehicle trim parts of this type can include, for example, simple backlit panels or carriers having through holes corresponding to a backlit or backlightable pattern. In order to additionally create an impression that is as aesthetically pleasing and pleasant to the touch as possible, the vehicle trim parts in this case can comprise a decorative, at least partially light transmitting, cover layer.

SUMMARY

The solutions discussed above are not satisfactory, as the through holes arranged behind the cover layer can usually create an inhomogeneous impression of the vehicle trim part, at least in terms of feel.

The present disclosure provides for an improved vehicle trim part, the improvement consisting in particular in the vehicle trim part conveying a homogeneous haptic impression.

Different embodiments and developments of the improved vehicle trim part is disclosed in the following description.

The proposed vehicle trim part with lighting function comprises an at least partially light transmitting cover layer, a light emitting light system for at least partially emitting light towards the cover layer, and a carrier arranged between the light system and the cover layer. The carrier comprises a plurality of recesses and a plurality of through holes, each of which is arranged on a surface of the carrier facing the cover layer and open towards said cover layer, the recesses being closed towards the light system and the through holes being open towards the light system.

The vehicle trim part thus comprises a carrier that can be backlit by the light system, which means that a predetermined light pattern can be formed on the cover layer. Since the carrier comprises both through holes that are open towards the cover layer and the light system, and recesses that are open only towards the cover layer, a particularly homogeneous haptic impression of the vehicle trim part is conveyed.

In the present case, light transmitting, in contrast to non-translucent or opaque, is substantially intended to be understood as optically transparent or translucent materials. In this case, light refers to visible light—i.e. light in the visible electromagnetic spectrum.

The vehicle trim part can be provided in particular for motor vehicles having an interior, for example for passenger cars. The vehicle trim part can be a vehicle interior trim part, for example as part of a door trim, a center console, a front console, a trunk trim or a roof trim.

The cover layer can be a translucent cover layer, i.e. it can be set up to substantially diffusely transmit light emitted by the light system. Alternatively, the cover layer can be transparent, i.e. it can be set up to transmit light emitted by the light system in a substantially directional manner. In the present case, the cover layer is a layer that can be seen from the outside, for example a decorative layer, when the vehicle trim part is used as intended. The intended use of the vehicle trim part is to be understood to mean its use as part of a vehicle trim when installed in a vehicle. Consequently, the carrier and the light system are arranged behind the cover layer, for an observer, when the vehicle trim part is used as intended.

The cover layer can be a substantially resilient cover layer. The cover layer can, for example, have a modulus of elasticity of 0.01 GPa to 0.5 GPa, in particular 0.2 GPa. In comparison, the carrier can be a substantially solid carrier. The carrier can, for example, have a modulus of elasticity of 0.5 GPa to 10 GPa, in particular 1 GPa to 2 GPa. The carrier can be a substantially dimensionally stable carrier that gives the vehicle trim part its essential shape and stability. The cover layer can be arranged adjacently to the carrier, in particular directly adjacently. The cover layer can cover the through holes and recesses. The cover layer can at least partially, in particular completely, cover a surface of the vehicle trim part that is visible from the outside when the vehicle trim part is used as intended. The cover layer can have depressions at least on a surface of the cover layer facing away from the carrier, which depressions are arranged in the region of the through holes and recesses. In other words, the cover layer can structurally reproduce and/or partially penetrate a contour, in particular a contour adjacent to the cover layer, of the through holes and recesses, on a surface of the cover layer facing away from the carrier, at least in regions. A depth of the depressions measured substantially towards the through holes and recesses can be at least 0.1 mm, and a smallest diameter measured orthogonally to this can be at least 0.5 mm. In the case of a cover layer comprising depressions, the cover layer can also be a substantially solid cover layer that is provided, for example, by deep-drawing on the carrier or embossed in accordance with the through holes and recesses. The cover layer can be a layer of the vehicle trim part that can be touched directly from the outside when the vehicle trim part is used as intended. The cover layer can be a substantially soft cover layer and have a compressive strength of 1 kPa to 50 kPa.

The carrier can be an at least partially reflective carrier. In this case, the carrier can have a reflective surface at least in part. The carrier can be set up to reflect light emitted by the light system on its surface. A reflectance of the carrier can be at least 40% or 60%. The reflectance generally describes the ratio between incident and reflected radiation. The carrier can at least partially comprise a reflective material. For example, surfaces facing the through holes and/or the light system and/or wall surfaces of the through holes can be reflective. For example, the surface of the carrier can be provided with a reflective film and/or another reflective coating. Alternatively, the carrier can consist at least partially of a reflective material. For example, the carrier can consist of a substantially white reflective material.

The carrier can be at least partially a substantially opaque carrier. It can be set up to transmit to the cover layer substantially only the light emitted by the light system that has passed through the through holes.

The vehicle trim part, the cover layer, the carrier and/or the light system can be substantially flat—i.e. having a base surface whose expansion in any direction is greater than the thickness of the corresponding component. In this case, the thickness of the cover layer is to be understood as its layer thickness. The cover layer, the carrier and/or the light system can extend substantially in parallel with and/or complementarily to each other in terms of their flat design. At least the carrier and/or the cover layer can be substantially flat or at least curved in portions on its surface visible from the outside. The cover layer, the carrier and/or the light system can be substantially flat or at least curved in portions.

The light system can be set up to provide substantially homogeneous backlighting of the carrier. Alternatively, the light system can be set up to illuminate predetermined regions of the carrier more intensively, in particular regions in which the through holes are open towards the light system and/or towards the cover layer. The light system can comprise at least one light source, for example an LED, a light panel or other illuminants. In addition, the light system can comprise at least one light guiding means which is set up to guide light coupled in from a light source and emit it at least partially towards the cover layer. In a light guiding means, light can be guided along the means in a targeted manner, for example depending on an angle of incidence, and emitted in a scattered or non-scattered manner. The light guiding means can extend substantially in parallel with the carrier and/or the cover layer. The light guiding means can, for example, comprise one or more laterally or radially emitting optical light guides which extend, for example, substantially in a plane in parallel with the cover layer and/or the carrier. As a further example, the light guiding means can be designed as a panel into which light from a light source can be coupled laterally or, conversely, frontally.

According to one embodiment, the vehicle trim part may further comprise a reflector which, viewed from the cover layer, is arranged behind the light system, in particular substantially behind a light guiding means of the light system. Similarly to the case of a reflective carrier, the reflector can at least partially comprise a reflective material or consist of a reflective material, in particular on a surface of the reflector facing the cover layer and/or the carrier. A reflectance of the reflector can be at least 40%, 60% or 80%. The reflector can be set up to reflect light emitted by the light system at least partially towards the cover layer and/or towards the carrier. The reflector can be a flat reflector and/or extend substantially in a plane in parallel with the carrier, the cover layer and/or the light system, in particular to a light guiding means of the light system. The reflector can be arranged directly adjacently to the light system, in particular to a light guiding means of the light system. The reflector can be formed integrally with the carrier. The light system can be at least partially enclosed in a carrier that is integral with the reflector. The reflector can have a higher rigidity, in particular a higher flexural strength, than the carrier.

In a region of the through holes—in particular in a region in which the through holes are open towards the light system—an open space can be formed between the light system and the carrier and/or between the light system and the reflector, in which space light emitted by the light system can propagate substantially unhindered. In other words, the carrier and/or the reflector can be spaced apart from the light system in this region.

The through holes and/or the open space can be filled with a filler, in particular with a transparent filler. The filler can be a polymer. The filler can have a strength that is greater than or equal to the strength of the carrier. Alternatively or additionally, the filler, in particular the filler filling the through holes, can have a refractive index of >1. For example, the refractive index can lie in a range between 1.4 and 1.6.

The through holes extend from an end that is open towards the cover layer to an end that is open towards the light system. The recesses extend from an end that is open towards the cover layer to an end that is closed towards the light system. In this case, the corresponding ends can be formed by a step in the carrier. The through holes and recesses can extend right up to the cover layer. The through holes and/or the recesses can have a minimum diameter and a maximum diameter at least at their end that is open towards the cover layer, as well as a minimum depth measured from their end that is open towards the cover layer in the direction of extension. The minimum diameter can be 0.5 mm or 5 mm, the maximum diameter 10 mm or 20 mm. The minimum depth can be 0.1 mm to 10 mm, for example 0.3 mm or 0.5 mm. These dimensions can be selected in such a way that the recesses and/or through holes are in principle tactilely and/or visually perceptible, visual perceptibility being intended to be based in particular on distances of, for example, 30 cm to 3 m, which are customary in passenger compartments. An elasticity, light transmission and/or thickness of the cover layer towards the carrier can be selected so that the recesses and/or through holes are tactilely and/or visually perceptible. Alternatively, the light transmission and/or thickness of the cover layer can be selected so that only the through holes are visually perceptible, and specifically only when the light emitting light system is switched on.

A minimum distance between two through holes on the surface of the carrier facing the cover layer can be smaller than a thickness of the cover layer, in particular a layer thickness of the cover layer in the region of the through holes. At least some of the through holes can extend substantially in parallel with or inclined relative to each other in the direction of extension.

The through holes can be tapered towards the cover layer. Alternatively, only some of the through holes can be tapered towards the cover layer. Depending on the desired light pattern on the cover layer, other continuous or discontinuous shape gradients are also possible in the direction in which the through holes extend.

The through holes and recesses can be at least partially substantially uniform and/or of the same size, at least on the surface of the carrier facing the cover layer. In this case, they can, for example, have a substantially round, circular, triangular or square shape and/or have substantially the same diameter. The through holes and recesses can be arranged in a substantially regular pattern and/or equidistant from an adjacent through hole or an adjacent recess.

The carrier can comprise or consist of polypropylene (PP), a blend of polycarbonate/acrylonitrile butadiene styrene (PC ABS), polycarbonate (PC) and/or natural fiber-reinforced polypropylene (NFPP). The cover layer can comprise or be a film, a leather and/or a textile. The cover layer can have a layer thickness of at least 0.5 mm, 1 mm or 5 mm. The vehicle trim part can substantially have an absolute depth, measured between a side of the cover layer facing away from the carrier and a side of the carrier or reflector facing away from the cover layer, of from 6 mm to 60 mm, or from 10 mm to 40 mm.

In the present case, several embodiments have been disclosed. Further embodiments of the present disclosure will become apparent to a person skilled in the art from the following detailed description, which shows and describes a further embodiment of the disclosure given by way of example. Accordingly, the drawings and the detailed description are to be regarded as illustrative and not limiting. Recurring features are provided with the same reference signs in the figures.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document. In the figures:

FIG. 2 is an example of a schematic plan view of the embodiment from FIG. 1 with the light system switched on.

DETAILED DESCRIPTION

Figure 1:
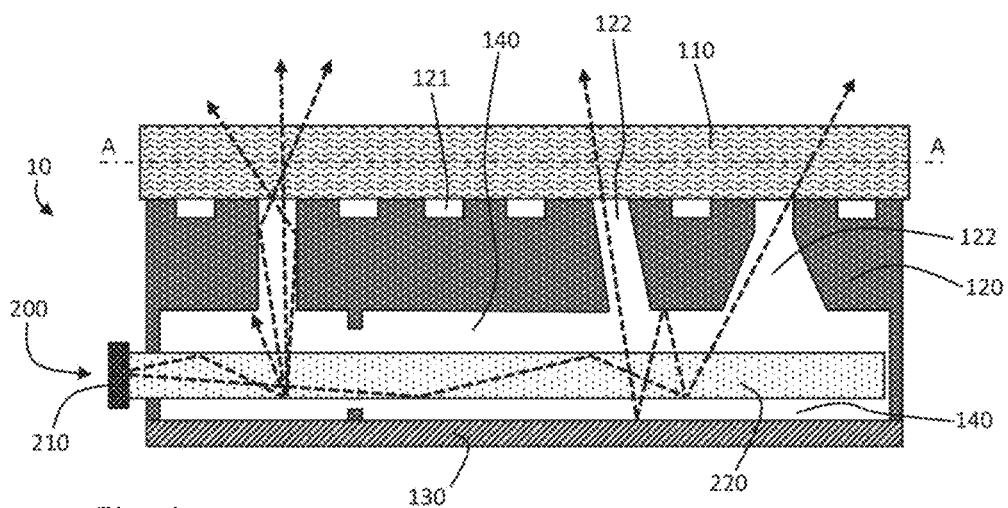
FIG. 1 is an example of a schematic sectional view of an embodiment of a vehicle trim part.
Figure 2:
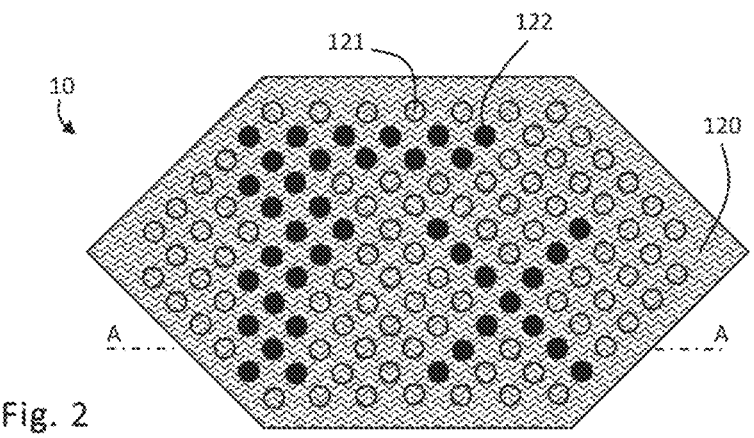
Figure 3:
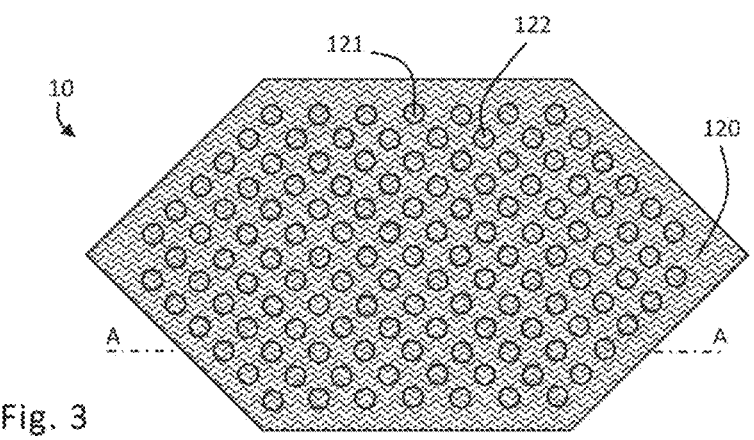
FIG. 3 is in example of a schematic plan view of the embodiment from FIG. 1 with the light system switched off.

FIGS. 1 to 3 show a possible embodiment of a vehicle trim part 10 with lighting function according to the present disclosure. In the following, recurring features are described once for both figures.

The vehicle trim part 10 with lighting function comprises an at least partially light transmitting cover layer 110, a light emitting light system 200 for at least partially emitting light towards the cover layer 110, and a carrier 120 arranged between the light system 200 and the cover layer 110. The carrier 120 comprises a plurality of recesses 121 and a plurality of through holes 122, each being arranged on a surface of the carrier 120 facing the cover layer 110 and open towards said cover layer, the recesses 121 being closed towards the light system 200 and the through holes 122 being open towards the light system 200.

The vehicle trim part 10 thus comprises a carrier 120 that can be backlit by the light system 200, whereby a predetermined light pattern can be formed on the cover layer 110 in accordance with the arrangement of the through holes 122 and recesses 121. In this case, according to FIG. 2 the light system 200 is switched on, i.e. the carrier 120 is backlit, and according to FIG. 3 the light system 200 is switched off, i.e. the carrier 120 is not backlit. Since the carrier 120 comprises both through holes 122 that are open towards the cover layer 110 and the light system 200, and recesses 121 that are open only towards the cover layer 110, a particularly homogeneous haptic impression of the vehicle trim part 10 is conveyed. In addition, the recesses 121 can contribute to a harmonious or more harmonious aesthetic impression of the vehicle trim part 10. For example, depending on the design of the cover layer 110, in particular its layer thickness or light transmission, and depending on the light conditions, in particular the light intensity of the light emitting light system 200 and an ambient light independent thereof, the recesses 121 may be visible on the cover layer 110, and thus supplement the through holes 122 in a harmonious manner. Furthermore, the weight of the vehicle trim part 10 can be reduced due to the recesses 121 provided in addition to the through holes 122. The proposed arrangement of just three essential components is particularly easy to manufacture. For example, the carrier 120 can be formed together with the through holes 122 and recesses 121 in a single step, or these can be drilled into the carrier 120 subsequently. As can be seen from FIGS. 2 and 3, the vehicle trim part 10 has a particularly harmonious design, it being possible for a desired light pattern on the cover layer 110, as for example in FIG. 2, to be depicted particularly easily.

The vehicle trim part 10 can be provided in particular for motor vehicles having an interior, for example for passenger cars. The vehicle trim part 10 can be a vehicle interior trim part, for example as part of a door trim, a center console, a front console, a trunk trim or a roof trim.

The cover layer 110 may be translucent, i.e. it may be set up to substantially diffusely transmit light emitted by the light system 200. A translucent cover layer 110 is particularly suitable for contributing to a harmonious impression of the vehicle trim part 10, as the light emitted by the light system 200 can appear particularly soft, for example. Alternatively, the cover layer 110 may be transparent, i.e. it may be set up to transmit light emitted by the light system 200 in a substantially directional manner. In the present case, the cover layer 110 is a layer that can be seen from the outside, for example a decorative layer, when the vehicle trim part 10 is used as intended. Consequently, the carrier 120 and the light system 200 are arranged behind the cover layer 110 for an observer, when the vehicle trim part 10 is used as intended.

The cover layer 110 can be substantially resilient. This can contribute to an improved haptic impression of the vehicle trim part 10. The cover layer 110 can, for example, have a modulus of elasticity of 0.01 GPa to 0.5 GPa, in particular 0.2 GPa. In comparison, the carrier 120 can be substantially solid. Accordingly, the carrier 120 can be tactilely perceptible through the cover layer 110. The carrier 120 can, for example, have a modulus of elasticity of 0.5 GPa to 10 GPa, in particular 1 GPa to 2 GPa. The carrier 120 may be substantially dimensionally stable and provide the vehicle trim part 10 with its essential shape and stability.

The cover layer 110 is arranged directly adjacently to the carrier 120. The cover layer 110 covers the through holes 122 and recesses 121. As can be seen from FIGS. 2 and 3, the cover layer 110 completely covers a surface of the vehicle trim part 10 that is visible from the outside, when the vehicle trim part 10 is used as intended. In this case, the cover layer 110 is a layer of the vehicle trim part 10 that can be touched directly from the outside, when the vehicle trim part 10 is used as intended. The combination of a resilient cover layer 110 covering the through holes 122 and recesses 121 and a solid carrier 120, in particular directly adjacent thereto, can provide a vehicle trim part 10 that is particularly harmonious to the touch. In an alternative embodiment not shown in the figures, the cover layer 110 may have depressions at least on a surface of the cover layer 110 facing away from the carrier 120, which depressions are arranged in the region of the through holes 122 and recesses 121. In other words, the cover layer 110 can structurally reproduce and/or partially penetrate a contour at least in regions, in particular a contour adjacent to the cover layer 110, of the through holes 122 and recesses 121 on a surface of the cover layer 110 facing away from the carrier 120. A depth of the depressions measured substantially towards the through holes 122 and recesses 121 can be at least 0.1 mm and a smallest diameter measured orthogonally thereto can be at least 0.5 mm. In the case of a cover layer 110 comprising depressions, the cover layer 110 can also be a substantially solid cover layer 110 which is provided, for example, by means of deep-drawing on the carrier or is embossed in accordance with the through holes 122 and recesses 121. By means of depressions formed in accordance with the through holes 122 and recesses 121, the cover layer 110 can contribute to a particularly harmonious haptic and/or aesthetic impression of the vehicle trim part 10. The cover layer 110 can in principle be substantially soft and have a compressive strength of 1 kPa to 50 kPa, in order to further improve the haptic impression of the vehicle part 10.

In FIG. 1, light trajectories, by way of example, of light emitted by a light system 200 are shown schematically by dashed arrows. The carrier 120 by way of example, which is shown, is correspondingly at least partially reflective.

As a result, a light yield provided at the cover layer 110 in the region of the through holes 122, but also the light emission angle, can be increased. In this case, the carrier 120 can at least partially have a reflective surface. The carrier 120 is set up to reflect light emitted by the light system 200 on its surface. A reflectance of the carrier 120 can be at least 40% or 60%. The carrier 120 may at least partially comprise a reflective material. According to FIG. 1, at least carrier surfaces facing the through holes 122 and the light system 200, but also the wall surfaces of the through holes 122, are reflective. According to FIG. 1, the carrier 120 consists of a reflective, for example substantially white, material. This variant is particularly easy to manufacture. Alternatively, the carrier 120 can be provided with a reflective film and/or another reflective coating on its surface.

The carrier 120 is in the present case opaque and designed to transmit to the cover layer 110 only the light emitted by the light system 200 that has passed through the through holes 122. Thus, a light pattern that can be provided on the cover layer 110 is substantially predetermined by the through holes 122, not by the recesses 121, as shown in FIG. 2, for example.

According to FIGS. 1 to 3, the entire vehicle trim part 10 and in particular the cover layer 110, the carrier 120 and the light system 200 are flat and substantially planar, the latter three components extending substantially in parallel with one another and also in a manner complementary to one another in accordance with their flat design. Accordingly, the sectional view in FIG. 1 is orthogonal to the base surface of the vehicle trim part 10. FIGS. 2 and 3, on the other hand, are plan views of the cover layer 110, the through holes 122 and recesses 121 arranged behind it being indicated at least schematically. The carrier 120 and the cover layer 110 are flat on their externally visible surface. Alternatively, curved and in particular parallel and/or mutually complementary portions of the components are also possible.

In the present case, the light system 200 is set up to provide substantially homogeneous backlighting of the carrier 120. Alternatively, the light system 200 can be set up to more intensively illuminate predetermined regions of the carrier 120, in particular regions in which the through holes 122 are open towards the light system 200 and/or are open towards the cover layer 110. For example, predetermined lighting effects and light patterns can be provided or purposely manipulated. The light system 200 comprises at least one light source 210, for example an LED. Alternatively, the light system 200 can also comprise a light panel or other illuminants. In addition, the light system 200 comprises at least one light guiding means 220, which is set up to guide light coupled in from a light source 210 and to emit it at least partially towards the cover layer 110. By using light guiding means 220, a light system 200 can generally be adapted more flexibly and variably to the ambient conditions. The light guiding means 220 extends substantially in parallel with the carrier 120 and the cover layer 110. According to the example shown here, the light guiding means 220 comprises at least one laterally or radially emitting optical light guide which extends in a plane in parallel with the cover layer 110 and with the carrier 120. In addition (not shown in FIG. 1), further light guides can extend in the same plane. As a further example, the light guiding means 220 can be designed as a panel into which light from a light source 210 can be coupled laterally or, conversely, frontally.

According to FIG. 1, the vehicle trim part 10 further comprises a reflector 130 which, viewed from the cover layer 110, is arranged behind the light system 200, in particular behind a light guiding means 220. Similarly to the case of the reflective carrier 120, the reflector 130 may at least partially comprise a reflective material or consist of a reflective material, in particular on a surface of the reflector 130 facing the cover layer 110 and/or the carrier 120. A reflectance of the reflector 130 can be at least 40%, 60% or 80%. The reflector 130 is set up to reflect light emitted by the light system 200 at least partially towards the cover layer 110 and towards the carrier 120. As a result, a light yield provided at the cover layer 110 in the region of the through holes 122 and, if necessary, the light emission angle, can be increased. The reflector 130 has a flat design and extends in a plane in parallel with the carrier 120, with the cover layer 110, and with the light system 200, in particular with the light guiding means 220. In the present case, the reflector 130 is arranged at a distance from the light system 200. However, it can also be arranged directly adjacently to the light system 200, in particular to the light guiding means 220. The reflector 130 can be formed integrally with the carrier 120. In this case, the light system 200 can be at least partially enclosed in a carrier 120 that is integral with the reflector. This can increase the stability of the vehicle trim part 10 and/or simplify its manufacture. The reflector 130 can have a higher rigidity, in particular a higher flexural strength, than the carrier 120. This can be particularly advantageous, as the reflector 130 can thus compensate for a reduced stability of the carrier 120 which is provided with numerous through holes 122 and recesses 121.

As shown in FIG. 1, an open space 140 is formed between the light system 200 and the carrier 120 and between the light system 200 and the reflector 130, in a region of the through holes 122—in particular in a region in which the through holes 122 are open towards the light system 200—in which space light emitted by the light system 200 can propagate substantially unhindered. In other words, the carrier 120 and the reflector 130 are spaced apart from the light system 200 in this region. This can also contribute to increasing a light yield provided at the cover layer 110 in the region of the through holes 122, in particular in combination with the reflector 130 and/or the at least partially reflective carrier 120.

The through holes 122 and/or the open space 140 can be filled with a filler, in particular with a transparent filler. The filler can be a polymer. The filler may have a strength that is greater than or equal to the strength of the carrier 120. This can also compensate for a reduced stability of the carrier 120 which is provided with numerous through holes 122 and recesses 121. Alternatively or additionally, the filler, in particular the filler filling the through holes 122, may have a refractive index of >1. The refractive index of >1 can increase a light emission angle at the through holes 122 towards the cover layer 110, which can contribute to a more homogeneous aesthetic impression of the vehicle trim part 10. The refractive index of the filler can lie in a range between 1.4 and 1.6. These are in particular usual values for transparent polymers.

The through holes 122 extend from an end that is open towards the cover layer 110 to an end that is open towards the light system 200. The recesses 121 extend from an end that is open towards the cover layer 110 to an end that is closed towards the light system 200. In this case, the corresponding ends are formed by a step in the carrier 120. The through holes 122 and the recesses 121 extend right up to the cover layer 110. The through holes 122 and/or the recesses 121 may have a minimum diameter and a maximum diameter at least at their end that is open towards the cover layer 110, as well as a minimum depth measured from their end that is open towards the cover layer 110 in the direction of extension. The minimum diameter can be 0.5 mm or 5 mm, the maximum diameter 10 mm or 20 mm. The minimum depth can be 0.1 mm to 10 mm, for example 0.3 mm or 0.5 mm. In this case, these dimensions can be selected in such a way that the recesses 121 and/or through holes 122 are in principle tactilely and/or visually perceptible, visual perceptibility being intended to be based in particular on distances of, for example, 30 cm to 3 m, which are customary in passenger compartments. The choice of suitable dimensions can contribute to a harmonious or more harmonious haptic and/or aesthetic impression of the vehicle trim part 10. In this case, an elasticity, light transmission and/or thickness of the cover layer 110 towards the carrier 120 can be selected such that the recesses and/or through holes are tactilely and/or visually perceptible. Alternatively, the light transmission and/or thickness of the cover layer 110 May be selected such that only the through holes 122 are visually perceptible, and specifically only when the light emitting light system 200 is switched on.

The smallest distance, in each case, between two through holes 122 on the surface of the carrier 120 facing the cover layer 110 is smaller than the thickness of the cover layer 110, as can be seen in FIGS. 1 to 3. This can be particularly desirable in combination with a translucent cover layer 110, as this means that if two adjacent sufficiently backlit through holes 122 are present they can no longer be visually distinguished from one another on the cover layer 110, i.e. a luminous pattern appears more homogeneous. At least some of the through holes 122 may extend substantially in parallel with or inclined relative to each other in the direction of extension. This makes it possible, for example, to create visual effects depending on the viewing direction. According to FIG. 1, the two outer through holes 122 extend in parallel with each other, while the intermediate through hole 122 extends at an angle to them.

The through holes 122 can be tapered towards the cover layer 110. Alternatively, only some of the through holes 122 may be tapered towards the cover layer 110. Here, this is the case for the sectional view shown in FIG. 1 for the through hole 122 arranged on the outer right-hand side. By tapering a through hole 122 accordingly, both a higher light yield and a higher light emission angle at the cover layer 110 can be achieved at said through hole. However, depending on the desired light pattern on the cover layer 110, other continuous or discontinuous shape gradients in the direction of extension of the through holes 122 are also possible. As a result, optical, for example viewing angle-dependent, effects and light intensity gradients can selectively be influenced on the cover layer 110.

In order, for example, to allow for the most harmonious impression possible of the vehicle trim part 10, the through holes 122 and recesses 121 are uniform and of the same size, at least on the surface of the carrier 120 facing the cover layer 110. In the present case, they have a circular shape with the same diameter. However, other shapes are of course also possible. In addition, the through holes 122 and recesses 121 are arranged in a regular pattern and so as to be equidistant from an adjacent through hole 122 or an adjacent recess 121.

The carrier 120 may comprise or consist of polypropylene (PP), a blend of polycarbonate/acrylonitrile butadiene styrene (PC ABS), polycarbonate (PC) and/or natural fiber-reinforced polypropylene (NFPP). Not only can these materials fulfill the requirements placed on the carrier 120, but they are also recyclable. The cover layer 110 may comprise or be a film, a leather and/or a textile. The cover layer 110 can have a layer thickness of at least 0.5 mm, 1 mm or 5 mm. The vehicle trim part 10 may substantially have an absolute depth, measured between a side of the cover layer 110 facing away from the carrier 120 and a side of the carrier 120 or reflector 130 facing away from the cover layer 110, of from 6 mm to 60 mm, or from 10 mm to 40 mm.

What is claimed is:

1. A vehicle trim part with lighting function, the vehicle trim part comprising:
    an at least partially light transmitting cover layer;
    a light emitting light system for at least partially emitting light towards the cover layer; and
    a carrier arranged between the light emitting light system and the cover layer, wherein the carrier comprises a plurality of recesses and a plurality of through holes, each being arranged on a surface of the carrier facing the cover layer and open towards the cover layer, and wherein the plurality of recesses are closed towards the light emitting light system and the plurality of through holes being open towards the light emitting light system.

2. The vehicle trim part according to claim 1, wherein at least one of: 1) the cover layer is a substantially resilient cover layer and the carrier is a substantially rigid carrier in comparison thereto, 2) wherein the cover layer is arranged adjacently to the carrier and covers the plurality of through holes and the plurality of recesses, or 3) wherein the cover layer has one or more depressions at least on a surface of the cover layer facing away from the carrier, and wherein the one or more depressions are arranged in a region including the plurality of through holes and the plurality of recesses.

3. The vehicle trim part according to claim 1, wherein at least one of: 1) the carrier is an at least partially reflective carrier which at least partially comprises a reflective material, or 2) wherein the carrier is at least partially a substantially opaque carrier.

4. The vehicle trim part according to claim 1, further comprising:
    a reflector which, viewed from the cover layer, is arranged behind the light emitting light system, at least partially comprises a reflective material and is configured to reflect light emitted by the light emitting light system at least partially towards at least one of the cover layer or the carrier, wherein the reflector has a higher rigidity than the carrier.

5. The vehicle trim part according to claim 4, wherein the reflector has a higher flexural strength than the carrier.

6. The vehicle trim part according to claim 4, wherein an open space is formed between at least one of: 1) the light emitting light system and the carrier or 2) the light emitting light system and the reflector, at least in a region of the plurality of through holes, in which space light emitted by the light emitting light system propagates substantially unhindered.

7. The vehicle trim part according to claim 6, wherein at least one of the plurality of through holes or the open space are filled with a filler, wherein the filler at least one of has a strength greater than or equal to the strength of the carrier or has a refractive index of >1.

8. The vehicle trim part according to claim 7, wherein the filler is a transparent filler.

9. The vehicle trim part according to claim 1, wherein a smallest distance between two through holes on the surface of the carrier facing the cover layer is smaller than a thickness of the cover layer in a region of the plurality of through holes.

10. The vehicle trim part according to claim 1, wherein the through holes are tapered towards the cover layer.

11. The vehicle trim part according to claim 1, wherein the plurality of through holes and the plurality of recesses are at least one of: 1) partially substantially uniform, 2) have a same size, 3) are arranged in a substantially regular pattern, or 4) are equidistant from an adjacent through hole or an adjacent recess, at least on the surface of the carrier facing the cover layer.

12. The vehicle trim part according to claim 1, wherein the carrier comprises at least one of polypropylene (PP), a blend of polycarbonate/acrylonitrile butadiene styrene (PC ABS), polycarbonate (PC), or natural fiber-reinforced polypropylene (NFPP).

13. The vehicle trim part according to claim 1, wherein the cover layer is translucent.

14. A vehicle trim part with lighting function, the vehicle trim part comprising:
  an at least partially light transmitting cover layer;
  a light emitting light system for at least partially emitting light towards the cover layer; and
  a carrier arranged between the light emitting light system and the cover layer, wherein the carrier comprises a plurality of recesses and a plurality of through holes, each being arranged on a surface of the carrier facing the cover layer and open towards the cover layer, and wherein the plurality of recesses are closed towards the light emitting light system and the plurality of through holes are open towards the light emitting light system;
  a reflector that, viewed from the cover layer, is arranged behind the light emitting light system, at least partially comprises a reflective material and is configured to reflect light emitted by the light emitting light system at least partially towards at least one of the cover layer or the carrier, wherein the reflector has a higher rigidity than the carrier; and
  wherein an open space is formed between each of: 1) the light emitting light system and the carrier or 2) the light emitting light system and the reflector, at least in a region of the plurality of through holes, in which open space light emitted by the light emitting light system propagates substantially unhindered.

15. The vehicle trim part according to claim 14, wherein at least one of the plurality of through holes or the open space are filled with a filler, wherein the filler at least one of has a strength greater than or equal to the strength of the carrier or has a refractive index of >1.

16. The vehicle trim part according to claim 15, wherein the filler is a transparent filler.

17. The vehicle trim part with lighting function according to claim 14, wherein the through holes are tapered towards the cover layer.

* * * * *